(12) United States Patent
Liu et al.

(10) Patent No.: US 11,457,071 B2
(45) Date of Patent: Sep. 27, 2022

(54) METHOD AND APPARATUS FOR COMMUNICATION BETWEEN PRIVATE NETWORKS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Jinshuai Liu, Beijing (CN); Siyuan Lei, Beijing (CN); Lei Zhou, Beijing (CN); Lianlian Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/347,288

(22) Filed: Jun. 14, 2021

(65) Prior Publication Data
US 2021/0306428 A1    Sep. 30, 2021

(30) Foreign Application Priority Data

Nov. 24, 2020  (CN) .......................... 202011326625.9

(51) Int. Cl.
*H04L 67/141*  (2022.01)
*H04L 41/12*   (2022.01)

(52) U.S. Cl.
CPC ............ *H04L 67/141* (2013.01); *H04L 41/12* (2013.01)

(58) Field of Classification Search
CPC ... H04L 67/141; H04L 41/12; H04L 12/4604; H04L 45/74; H04L 61/5038
See application file for complete search history.

(56) References Cited

U.S. PATENT DOCUMENTS

2008/0130666 A1* 6/2008 Kawamoto .......... H04L 65/102
                                                370/401
2013/0294453 A1* 11/2013 Han ...................... H04L 45/58
                                                370/401

(Continued)

OTHER PUBLICATIONS

Partial European Search Report for European Application No. 21178578.7, dated Nov. 3, 2021, 5 pages.

(Continued)

*Primary Examiner* — Austin J Moreau
*Assistant Examiner* — Thao D Duong
(74) *Attorney, Agent, or Firm* — Seed IP Law Group LLP

(57) ABSTRACT

A method, apparatus, electronic device, and computer readable storage medium for communication between private networks are provided. An embodiment of the method may include: receiving a communication request sent by a first sub-instance provided in a first private network, the first sub-instance being created based on that the first private network initiates a network registration request to a master instance; determining a second private network as a destination based on the communication request; and sending the communication request to the second private network through a second sub-instance provided in the second private network, the second sub-instance being created based on that the second private network initiates a network registration request to the master instance, wherein the first private network, the second private network, and a cloud enterprise network provided with the master instance forms a star topology centered on the cloud enterprise network.

14 Claims, 5 Drawing Sheets

(56) References Cited

U.S. PATENT DOCUMENTS

| | | |
|---|---|---|
| 2017/0093702 A1 | 3/2017 | Teng et al. |
| 2017/0244593 A1 | 8/2017 | Rangasamy et al. |
| 2019/0158605 A1 | 5/2019 | Markuze et al. |
| 2020/0059512 A1* | 2/2020 | Ajodha .................. H04L 67/10 |
| 2020/0099659 A1 | 3/2020 | Cometto et al. |
| 2020/0252375 A1 | 8/2020 | Chen et al. |
| 2021/0058364 A1* | 2/2021 | Tillotson ............. H04L 43/0817 |
| 2021/0250386 A1* | 8/2021 | Cozzi ..................... H04L 67/52 |

OTHER PUBLICATIONS

Extended European Search Report for European Application No. 21178578.7, dated Feb. 16, 2022, 11 pages.

\* cited by examiner

METHOD AND APPARATUS FOR COMMUNICATION BETWEEN PRIVATE NETWORKS, ELECTRONIC DEVICE AND STORAGE MEDIUM

CROSS-REFERENCE TO RELATED APPLICATIONS

This application claims priority to Chinese Patent Application No. 202011326625.9, filed with the China National Intellectual Property Administration (CNIPA) on Nov. 24, 2020, the content of which is incorporated herein by reference in its entirety.

TECHNICAL FIELD

The present disclosure relates to the field of cloud computing, in particular to the field of cloud platforms, and more particular to a method and apparatus for communication between private networks, electronic device and computer readable storage medium.

BACKGROUND

With the development of electronic information technology and the trend of globalization of fine division of labor, different enterprises often only specialize in a certain type of online service and hold a large amount of certain type of data, and their internal data are often only circulated in their internal private networks.

However, as users gradually develop their demands on comprehensive businesses, service providers of a single type can no longer meet the needs of the users. Therefore, how to achieve data cooperation between service providers is a research focus of those skilled in the art.

SUMMARY

Embodiments of the present disclosure propose a method, apparatus, electronic device, and computer readable storage medium for communication between private networks.

According to a first aspect, some embodiments of the present disclosure provide a method for communication between private networks. The method includes: receiving a communication request sent by a first sub-instance provided in a first private network, the first sub-instance being created based on that the first private network initiates a network registration request to a master instance;

determining a second private network as a destination based on the communication request; and sending the communication request to the second private network through a second sub-instance provided in the second private network, the second sub-instance being created based on that the second private network initiates a network registration request to the master instance, where the first private network, the second private network, and a cloud enterprise network provided with the master instance forms a star topology centered on the cloud enterprise network.

According to a second aspect, some embodiments of the present disclosure provide an apparatus for communication between private networks. The apparatus includes: a communication request receiving unit, configured to receive a communication request sent by a first sub-instance provided in a first private network, the first sub-instance being created based on that the first private network initiates a network registration request to a master instance; a communication destination determination unit, configured to determine a second private network as a destination based on the communication request; and a communication request sending unit, configured to send the communication request to the second private network through a second sub-instance provided in the second private network, the second sub-instance being created based on that the second private network initiates a network registration request to the master instance, where the first private network, the second private network, and a cloud enterprise network provided with the master instance forms a star topology centered on the cloud enterprise network.

According to a third aspect, some embodiments of the present disclosure provide an electronic device. The electronic device includes at least one processor; and a memory, communicatively connected to the at least one processor; where the memory, storing instructions executable by the at least one processor, the instructions, when executed by the at least one processor, cause the at least one processor to perform the method for communication between private networks according to the first aspect.

According to a fourth aspect, some embodiments of the present disclosure provide a non-transitory computer readable storage medium, storing computer instructions, the computer instructions, when executed by a processor, cause the processor to perform the method for communication between private networks according to the first aspect.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

By reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
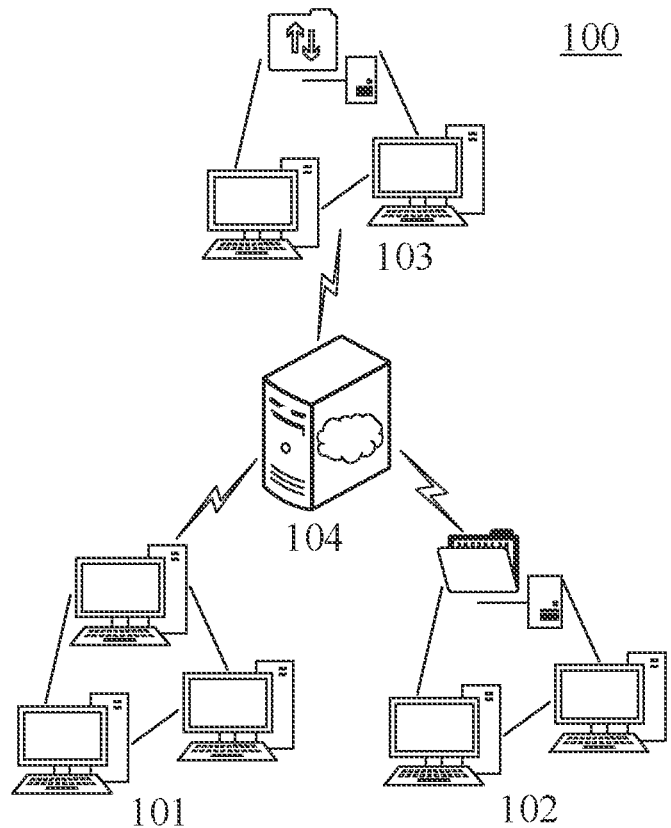
FIG. 1 is an exemplary system architecture to which embodiments of the present disclosure may be implemented.

FIG. 1 shows an exemplary system architecture 100 to which embodiments of a method and apparatus for communication between private networks, electronic device, and computer readable storage medium may be implemented.

As shown in FIG. 1, the system architecture 100 may include a first private network 101, a second private network 102, a third private network 103, and a cloud enterprise network 104. Each private network may communicate with the cloud enterprise network 104 through the network, and the network may include various connection types, such as wired, wireless communication links, or optic fibers.

Each private network includes at least one terminal device (such as a PC, a workstation, or a server). A user in each private network may send information to the cloud enterprise network 104 through a terminal device, so that the cloud enterprise network 104 forwards the received information to another private network at a real destination. The foregoing information sending behavior may be implemented using various applications installed in the terminal device, such as information sending applications, instant messaging applications, or data transmission applications.

Each private network is usually represented as an assembly of hardware and software. That is, each private network includes some hardware terminals, and may also include some virtual terminals constructed by virtualization technology. Of course, in particular circumstances, each private network may also only be represented as a hardware terminal assembly, or a virtual terminal assembly. The cloud enterprise network 104 is usually represented as a hardware terminal. For example, the cloud enterprise network 104 may be implemented as a distributed server cluster composed of a plurality of servers, or as a single server; in particular, when the cloud enterprise network 104 is represented as software, the cloud enterprise network 104 may be implemented as a plurality of software or software modules, and may also be implemented as a single software or software module, which is not limited herein.

The cloud enterprise network 104 may provide various services through various built-in applications. For example, a data communication application that may provide data communication services between private networks, the cloud enterprise network 104 may achieve the following effects when running the data communication application: first, receiving a communication request sent by a first sub-instance provided in a first private network; next, determining a second private network as a destination based on the communication request; then, sending the communication request to the second private network through a second sub-instance provided in the second private network. The first sub-instance and the second sub-instance are created based on network registration requests respectively initiated by the first private network and the second private network to the master instance in the cloud enterprise network, and then with the help of communication links established between the sub-instances and the master instance, the first private network, the second private network, and the cloud enterprise network form a star topology centered on the cloud enterprise network.

The method for communication between private networks provided in subsequent embodiments of the present disclosure is generally performed by the cloud enterprise network 104. Accordingly, the apparatus for communication between private networks is generally also provided in the cloud enterprise network 104.

It should be understood that the number of private networks and the number of servers forming the cloud enterprise network in FIG. 1 are merely illustrative. Depending on the implementation needs, there may be any number of private networks connected to the cloud enterprise network.

Figure 2:
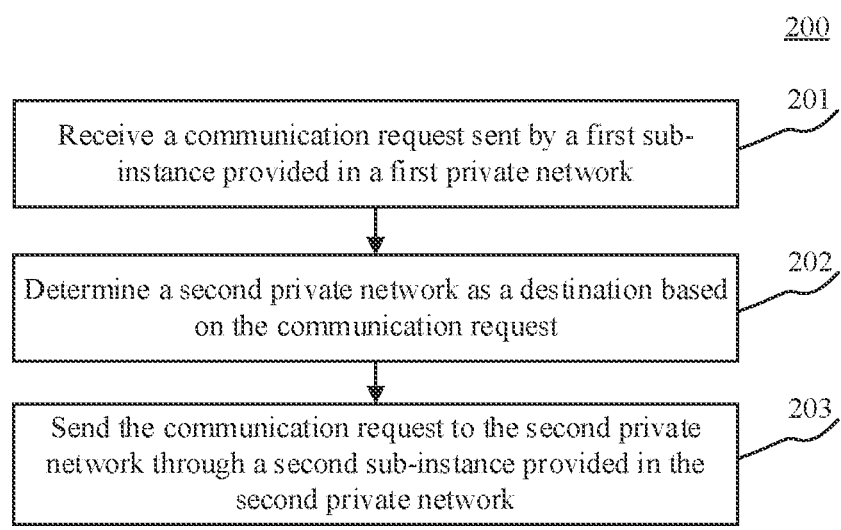
FIG. 2 is a flowchart of a method for communication between private networks according to an embodiment of the present disclosure.

With reference to FIG. 2. FIG. 2 is a flowchart of a method for communication between private networks according to an embodiment of the present disclosure, where a flow 200 includes the following steps:

Step 201: receiving a communication request sent by a first sub-instance set in a first private network.

This step aims to receive the communication request sent by the first sub-instance provided in the first private network by an executing body of the method for communication between private networks (for example, the cloud enterprise network 104 shown in FIG. 1).

The first sub-instance is created based on that the first private network initiates a network registration request to a master instance. After the creation of the first sub-instance is completed, the first sub-instance may establish a communication link between the first private network and the cloud enterprise network based on the built-in master instance provided in the executing body. The creation of the first sub-instance may be completed under the control of the executing body, or may be completed under the control of the first private network.

The communication request includes at least a communication destination and a communication content. The communication destination refers to the private network to which the communication content is to be sent through the cloud enterprise network. The communication destination may be expressed as a communication address or an identification of a target private network, so that the cloud enterprise network may identify the destination based on the communication address or the identification; the communication content may be in the form of plain text or cipher text. When being in the form of cipher text, the communication content should at least carry relevant content that enables the destination to know how to correctly analyze the communication content into plain text, such as an identification of an encryption algorithm.

Further, when the target private network or the destination private network needs to verify the received content, the communication request may also be attached with a relevant identification used to represent that the communication request should pass the verification, such as an electronic signature of the sender, an electronic certificate of the sender, an identity identification of the sender.

Step 202: determining a second private network as a destination based on the communication request.

On the basis of step 201, this step 202 aims to determine, by the executing body, the second private network as the destination based on the communication request.

When the communication destination in the communication request is represented as a communication address, the executing body may record and obtain a corresponding relationship between the private network and the communication address thereof through the communication address contained in the network registration request previously sent by each private network, so as to determine the private network corresponding to the communication address based on the recorded corresponding relationship; when the communication destination in the communication request is represented as an identification, the executing body may also directly determine the target private network as the destination by analyzing the identification. In addition, the executing body may also use other methods to determine the target private network as the destination, and detailed description thereof will be omitted.

Step 203: sending the communication request to the second private network through a second sub-instance provided in the second private network.

Similar to the first sub-instance, the second sub-instance is created based on that the second private network initiates a network registration request to the master instance. It should be understood that with the increase of private networks, the private networks and the cloud enterprise network form a star topology centered on the cloud enterprise network. That is, the private networks establish connection relationships with the master instance provided in the centralized cloud enterprise network only through the sub-instances provided in the private networks locally respectively, then help any private network to forward communication content to another private network through the transit of the cloud enterprise network, realizing data communication between the private networks.

On the basis of step 202, this step 203 aims to send, by the executing body, the communication request to the second private network via the second sub-instance provided in the second private network. That is, with the help of the communication link established between the master instance provided in the executing body and the second sub-instance, the communication request is forwarded to the second private network.

Further, when the communication request received by the master instance from the first private network contains a timed sending identifier, it may also send the communication request to the second private network according to a set time contained in the timed sending identifier, in order to ensure that the second private network receives the communication request at the set time, and guarantee that time for receiving response information returned by the second private network is after the set time.

According to the method for communication between private networks provided by an embodiment of the present disclosure, the private networks establish communication links only with the centralized cloud enterprise network respectively, so as to achieve the purpose of data communication between the private networks with the least number of communication links established with the help of a formed star topology. In addition, the establishment of the communication links is based on the master instance in the centralized cloud enterprise network and the sub-instances set in the private networks, no complicated configuration is required, which is more convenient and efficient, and the network complexity is low.

Figure 3:
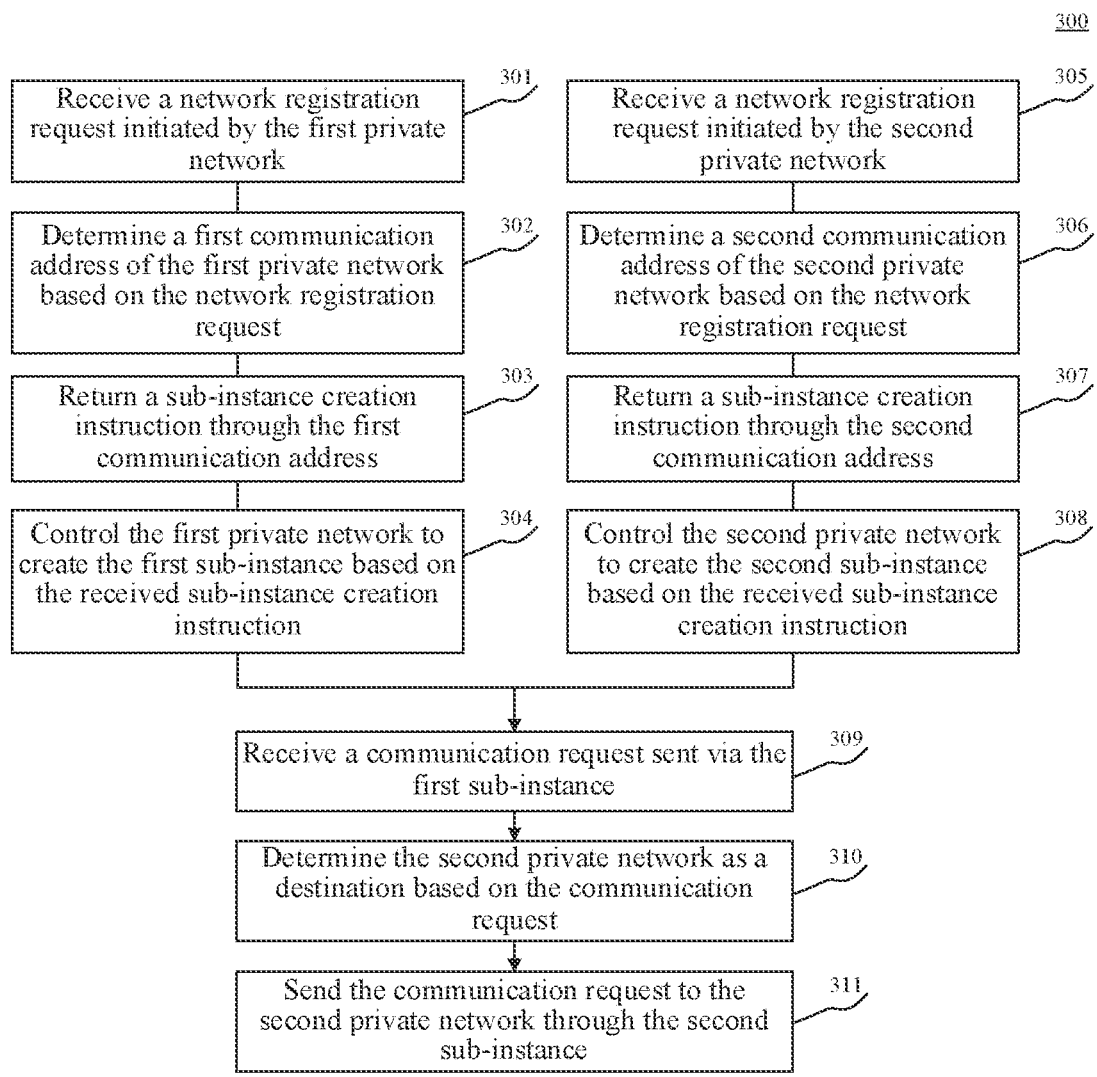
FIG. 3 is a flowchart of an method for communication between private networks according to another embodiment of the present disclosure.

With reference to FIG. 3, FIG. 3 is a flowchart of a method for communication between private networks according to an embodiment of the present disclosure, where the flow 300 includes the following steps:

Step 301: receiving the network registration request initiated by the first private network.

This step aims to receive, by the executing body, the network registration request initiated by the first private network. The network registration request is used by the first private network to register the first private network in the cloud enterprise network, so as to perform data communication with other registered private networks as a registered private network through the executing body.

Step 302: determining a first communication address of the first private network based on the network registration request.

On the basis of step 301, this step 302 aims to determine, by the executing body, the first communication address of the first private network based on the network registration request. That is, the network registration request includes at least the communication address of the first private network, or at least can be used to determine relevant content of the communication address, such as an offset address relative to a certain starting address in a fixed address table.

Step 303: returning a sub-instance creation instruction through the first communication address.

On the basis of step 302, this step 303 aims to return, by the executing body, the sub-instance creation instruction through the first communication address. The sub-instance creation instruction is used to instruct the destination receiving the instruction to create locally a sub-instance for communicating with the master instance provided in the executing body. Therefore, the sub-instance creation instruction contains information about how to communicate with the master instance.

Step 304: controlling the first private network to create the first sub-instance based on the received sub-instance creation instruction.

On the basis of step 303, this step 304 aims to control, by the executing body, the first private network to create the first sub-instance based on the received sub-instance creation instruction.

That is, the above steps 301 to 304 give a solution in which the private network creates a sub-instance locally under the control of the cloud enterprise network, so that a stable communication link between the private network and the cloud enterprise network may be established based on the connection between the sub-instance and the master instance.

Step 305: receiving the network registration request initiated by the second private network.

Step 306: determining a second communication address of the second private network based on the network registration request.

Step 307: returning a sub-instance creation instruction through the second communication address.

Step 308: controlling the second private network to create the second sub-instance based on the received sub-instance creation instruction.

Step 305 to step 308 are the same as step 301 to step 304, except that the object that initiates the network registration request is changed from the first private network to the second private network, so that the executing body may control the second private network to create and obtain the second sub-instance locally, based on the determined second communication address.

Step 309: receiving a communication request sent via the first sub-instance.

In the situation that the first private network has established the communication link with the master instance provided in the executing body through the first sub-instance, this step 309 aims to receive, by the executing body, the communication request sent from the first private network via the first sub-instance.

Step 310: determining the second private network as a destination based on the communication request.

On the basis of step 309, this step 310 aims to determine, by the executing body, the second private network as the communication destination based on the received communication request.

Step 311: sending the communication request to the second private network through the second sub-instance.

On the basis of step 310, this step 311 aims to send, by the executing body, the communication request to the second private network through the communication link established between the master instance and the second sub-instance.

Compared with the previous embodiment, the present embodiment gives a solution on how to create and obtain a sub-instance in the private network through step 301 to step 308. That is, the executing body issues a sub-instance creation instruction to the private network, so that the sub-instance may be created independently based on the content of the instruction, and the communication with the master instance may be automatically established by the sub-instance, so that the communication link may be quickly established without excessive participation of the private network, and a degree of automation is higher and more accurate.

Figure 4:
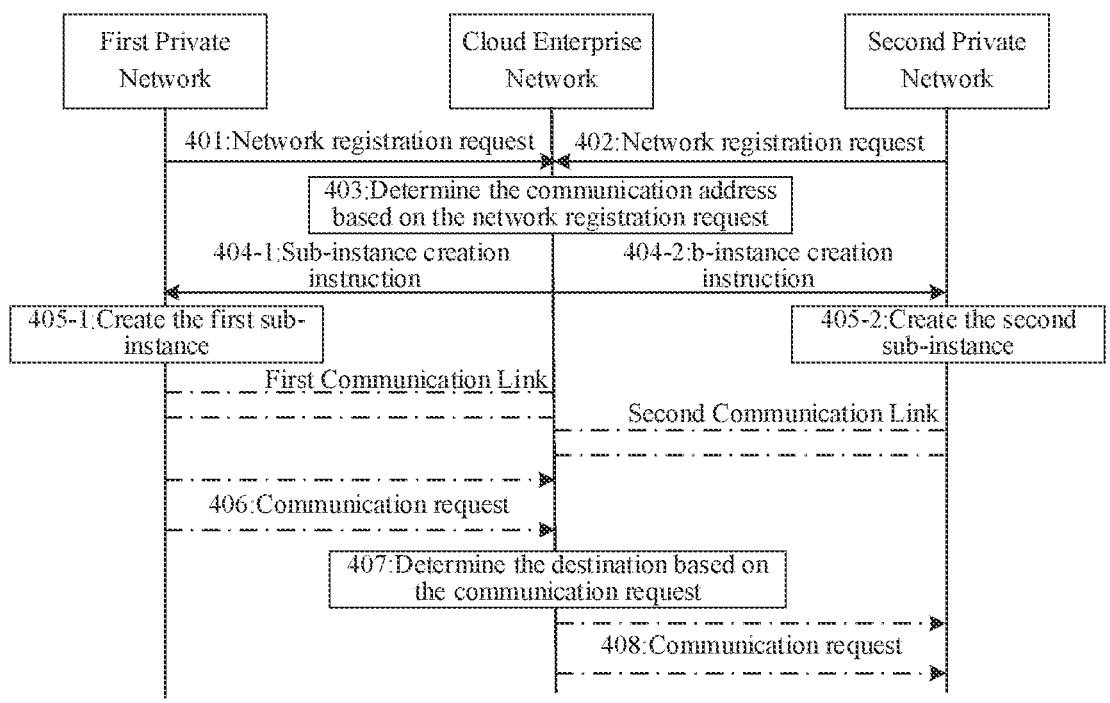
FIG. 4 is a sequence diagram corresponding to the flowchart shown in FIG. 3 according to an embodiment of the present disclosure.

FIG. 3 shows a flowchart of an entire solution described from the side of the cloud enterprise network. In order to have a clearer understanding of the operations performed by each executing body and the interactions with other executing bodies in the solution. An embodiment of the present disclosure also provides FIG. 4 corresponding to FIG. 3. FIG. 4 shows the steps performed by each executing body in the form of a sequence diagram, and the content includes:

Step 401: The first private network sends a network registration request to the cloud enterprise network;

Step 402: The second private network sends a network registration request to the cloud enterprise network;

Step 403: The cloud enterprise network respectively determines the first communication address and the second communication address based on the two received network registration requests;

Step 404-1: The cloud enterprise network sends the sub-instance creation instruction to the first private network through the first communication address;

Step 404-2: The cloud enterprise network sends the sub-instance creation instruction to the second private network through the second communication address;

Step 405-1: The first private network creates the first sub-instance based on the received sub-instance creation instruction;

Step 405-2: The second private network creates the second sub-instance based on the received sub-instance creation instruction;

Step 406: The first private network sends a communication request directed to the second private network to the cloud enterprise network through an established first communication link;

Step 407: The cloud enterprise network determines that destination of the communication request is the second private network; and Step 408: The cloud enterprise network sends the communication request to the second private network through an established second communication link.

On the basis of any of the above embodiments, in order to further improve the speed of determining the communication destination by the cloud enterprise network as the executing body, thereby improving an overall communication efficiency, the communication address of the corresponding private network included in the network registration request may also be identified by using a border gateway protocol. Border gateway protocol (BPG) is an autonomous system routing protocol running on TCP, which can properly handle protocol for multiple connections between unrelated routing domains. A main function of the BGP system is to exchange network reachability information with other BGP systems. The network reachability information includes information of the listed autonomous system (AS), which effectively constructs a topology diagram of AS interconnection and thus eliminates a routing loop, and at the same time implements strategic decisions at the AS level. That is, with the help of BGP, a routing protocol that can learn independently, it may learn the communication address of a registered private network more convenient and timely, so as to ensure that the communication address can be updated in time even if the communication address is changed, thereby ensuring that the communication request is indeed sent to the destination.

Further, a private network routing table may also be generated based on the communication address of each private network identified by the border gateway protocol, so that the executing body may directly determine the communication destination through the private network routing table. Furthermore, when a new private network completes a network registration request, a latest updated network routing table including a communication address of the new private network may also be sent to each currently registered private network respectively, so that the registered private network may learn about other registered private networks with which it may communicate. At the same time, in order to facilitate the understanding of characteristics of other private networks, relevant characteristic descriptions of the corresponding private networks may also be added in the routing table, such as user face information, or vehicle driving information.

Figure 5:
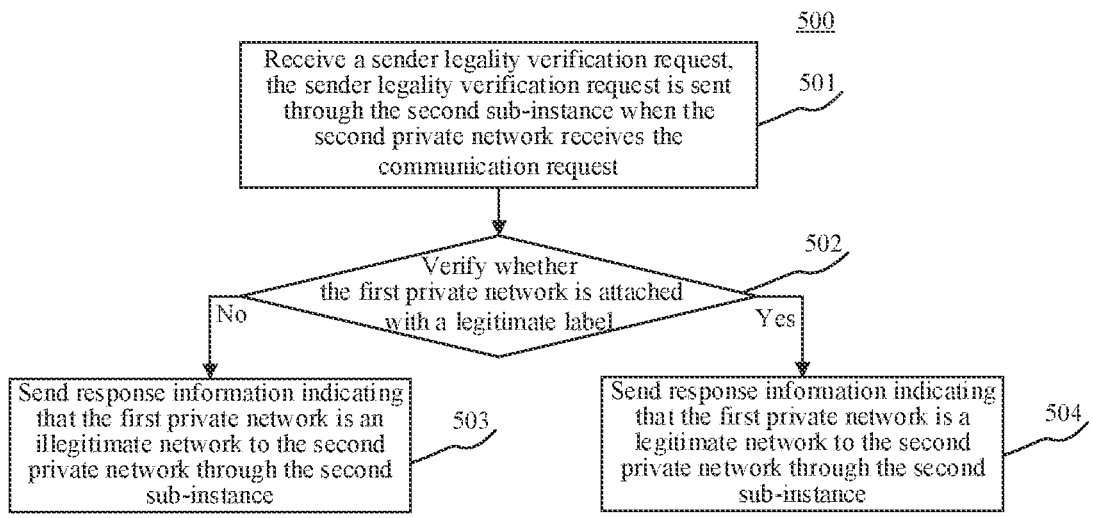
FIG. 5 is a schematic flowchart of a method for verifying legitimacy of a communication initiator according to an embodiment of the present disclosure.
Figure 6:
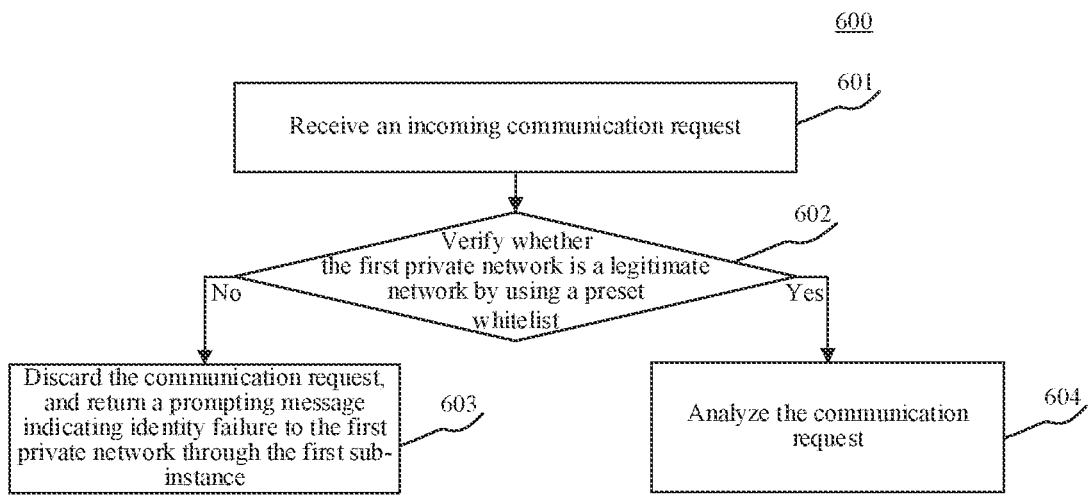
FIG. 6 is a schematic flowchart of an method for verifying legitimacy of a communication initiator according to another embodiment of the present disclosure.

On the basis of any of the above embodiments, taking into account the security of data communication between different private networks, in the present embodiment, FIG. 5 and FIG. 6 respectively provide two different solutions for legality verification of a communication initiator by the communication destination.

FIG. 5 shows a legality verification solution with the cloud enterprise network as the executing body, including the following steps:

Step 501: receiving a sender legality verification request, the sender legality verification request is sent through the second sub-instance when the second private network receives the communication request.

This step aims to receive, by the cloud enterprise network, the sender legality verification request sent through the second sub-instance, the sender legality verification request is sent through the second sub-instance when the second private network receives the communication request. That is, after receiving the communication request sent by the cloud enterprise network and before analyzing content of the communication request, the second private network initiates a request to the cloud enterprise network to verify the legitimacy of the sender of the communication request (that is, the first private network).

In the present embodiment, since the cloud enterprise network, as an authoritative third-party organization, has identified the legalities of registered private networks in advance, and legality certification of the cloud enterprise network as an authoritative third-party organization is recognized by vast private networks, the legitimacy of the sender may be verified by the cloud enterprise network.

Step 502: verifying whether the first private network is attached with a legitimate label, if yes, perform step 504, otherwise perform step 503;

On the basis of step 501, this step 502 aims to verify, by the executing body, whether the first private network is attached with the legitimate label. If the cloud enterprise network previously determines that the first private network is a legitimate network, a legitimate label may be attached to the first private network. That is, a private network being attached with a legitimate label indicates that the corresponding private network has passed the legality verification of the cloud enterprise network and belongs to a legitimate network.

Step 503: sending response information indicating that the first private network is an illegitimate network to the second private network through the second sub-instance;

This step is based on a judgment result of step 502 that the first private network is not attached with a legitimate label, therefore, the response information indicating that the first private network is an illegitimate network may be sent to the second private network through the second sub-instance, so that the second private network that receives the response information discards the communication request.

Step 504: sending response information indicating that the first private network is a legitimate network to the second private network through the second sub-instance.

This step is based on a judgment result of step 502 that the first private network is attached with a legitimate label, therefore, the response information indicating that the first private network is a legitimate network may be sent to the second private network through the second sub-instance, so that the second private network that receives the response information starts to analyze the communication request.

That is, the present embodiment hands over the security and legality verification to the centralized cloud enterprise network. That is, the cloud enterprise network is an authoritative third-party organization trusted by the private networks, thereby eliminating the need for each private network to configure its own security and legality verification mechanisms.

Furthermore, if all private networks enable an option of requiring the cloud enterprise network to verify the legality of the communication request, the step of legality verification may be performed before the cloud enterprise network forwarding the communication request to the corresponding communication destination.

Different from FIG. 5, FIG. 6 provides an implementation solution of legality verification performed by the communication destination, including the following steps:

Step 601: receiving an incoming communication request;

This step aims to receive, by the second private network, the incoming communication request from the cloud enterprise network.

Step 602: verifying whether the first private network is a legitimate network, if yes, perform step 604, otherwise perform step 603;

On the basis of step 601, this step 602 aims to verify, by the second private network, whether the first private network that sends the communication request is a legitimate network by using a preset whitelist. The whitelist is pre-set by the second private network, and records information of private network that identified as legitimate networks.

Step 603: discarding the communication request, and returning a prompting message indicating identity failure to the first private network through the first sub-instance;

This step is based on a judgment result of step 602 that the first private network is not recorded in the whitelist. That is, the second private network discards the communication request, and returns the prompting message indicating identity failure to the first private network through the first sub-instance.

Step 604: analyzing the communication request.

This step is based on a judgment result of step 602 that the first private network is recorded in the whitelist. That is, the second private network analyzes the communication request.

That is, in the present embodiment, the security and legality verification is implemented by the communication destination itself, so that the authority to whether to respond to the communication request is maximized and handed over to the communication destination, and the security of sensitive information in the communication destination is guaranteed as much as possible.

To deepen understanding, some embodiments of the present disclosure also provide an implementation solution in combination with an application scenario:

In this scenario, there are a total of four private networks constructed by different enterprises, namely private network A, private network B, private network C, and private network D. Now, these four enterprises need to achieve limited data exchange and mutual communication based on common needs. The needs may be satisfied by the following solution:

1) The private network A, the private network B, the private network C, and the private network D respectively initiate a network registration request to a cloud enterprise network;

A registration request includes a communication address of a private network and data types that can be provided by the private network could.

2) The cloud enterprise network respectively acquires a communication address A, a communication address B, a communication address C, and a communication address D based on the network registration requests;

3) The cloud enterprise network respectively sends a sub-instance creation instruction through the communication address A, the communication address B, the communication address C, and the communication address D respectively;

4) The private network A, the private network B, the private network C, and the private network D create a sub-instance A, a sub-instance B, a sub-instance C, and a sub-instance D locally respectively based on the sub-instance creation instruction;

5) The sub-instance A, the sub-instance B, the sub-instance C, and the sub-instance D respectively establish a communication link A, a communication link B, a communication link C, and a communication link D with the master instance in the cloud enterprise network;

That is, a star topology centered on the cloud enterprise network is formed through the established communication link A, communication link B, communication link C, and communication link D.

6) The private network A, the private network B, the private network C, and the private network D each sends a communication request to the cloud enterprise network through the star topology result; and 7) The cloud enterprise network forwards the communication requests based on destinations in the communication requests.

Figure 7:
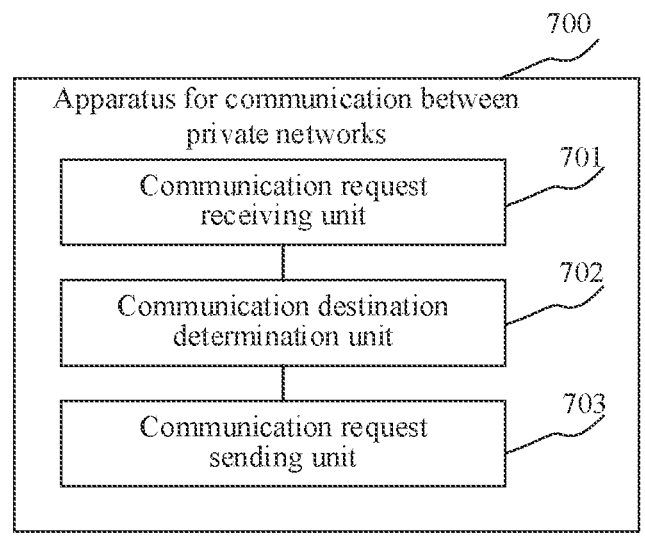
FIG. 7 is a structural block diagram of an apparatus for communication between private networks according to an embodiment of the present disclosure.

With further reference to FIG. 7, as an implementation of the method shown in the above figures, an embodiment of the present disclosure provides an apparatus for communication between private networks. The apparatus embodiment corresponds to the method embodiment as shown in FIG. 2. The apparatus may be applied to various electronic devices.

As shown in FIG. 7, an apparatus 700 for communication between private networks of the present embodiment may include: a communication request receiving unit 701, a communication destination determination unit 702, a communication request sending unit 703. The communication request receiving unit 701 is configured to receive a communication request sent by a first sub-instance provided in a first private network, the first sub-instance being created based on that the first private network initiates a network registration request to a master instance. The communication destination determination unit 702 is configured to determine a second private network as a destination based on the communication request. The communication request sending unit 703 is configured to send the communication request to the second private network through a second sub-instance provided in the second private network, the second sub-instance being created based on that the second private network initiates a network registration request to the master instance, where the first private network, the second private network, and a cloud enterprise network provided with the master instance forms a star topology centered on the cloud enterprise network.

In the present embodiment, in the apparatus 700 for communication between private networks: for the detailed processing and the technical effects of the communication request receiving unit 701, the communication destination determination unit 702, the communication request sending unit 703, reference may be made to the relevant descriptions of step 201, step 202 and step 203 in the embodiment corresponding to FIG. 2 respectively, and detailed description thereof will be omitted.

In some alternative implementations of the present embodiment, the apparatus 700 for communication between private networks may further include: a sub-instance creation unit configured to create the first sub-instance/the second sub-instance, and the sub-instance creation unit includes:

a network registration request receiving subunit, configured to receive the network registration request initiated by the first private network/the second private network;

a communication address determination subunit, configured to determine a first communication address/a second communication address of the first private network/the second private network based on the network registration request;

a sub-instance creation instruction returning subunit, configured to return a sub-instance creation instruction through the first communication address/the second communication address; and a sub-instance creation subunit, configured to control the first private network/the second private network to create the first sub-instance/the second sub-instance based on the received sub-instance creation instruction.

In some alternative implementations of the present embodiment, the communication address determination subunit may be further configured to:

identify the first communication address/the second communication address of the first private network/the second private network included in the network registration request based on a border gateway protocol.

In some alternative implementations of the present embodiment, the apparatus 700 for communication between private networks may further include:

a routing table generation unit, configured to generate a private network routing table based on the communication address of each private network identified by the border gateway protocol.

In some alternative implementations of the present embodiment, the apparatus 700 for communication between private networks may further include:

a latest network routing table sending unit, configured to, when a new private network completing a network registration request, sending a latest updated network routing table including a communication address of the new private network to each private network currently registered with the master instance, respectively.

In some alternative implementations of the present embodiment, the apparatus 700 for communication between private networks may further include:

a whitelist verification unit, configured to control the second private network to verify whether a sender of the communication request is a legitimate network based on a preset whitelist; and a verification failure processing unit, configured to control the second private network to discard the communication request in response to the sender of the communication request being an illegitimate network that is not recorded on the whitelist, and return a prompting message for indicating identity failure to the first private network through the first sub-instance.

In some alternative implementations of the present embodiment, the apparatus 700 for communication between private networks may further include:

a legality verification request receiving unit, configured to receive a sender legality verification request sent through the second sub-instance, where the sender legality verification request is sent through the second sub-instance when the second private network receives the communication request;

a legitimate label attachment detection unit, configured to verify whether the first private network that sends the communication request is attached with a legitimate label based on the sender legality verification request; and a verification success processing unit, configured to return a sender legitimate signal to the second private network through the second sub-instance in response to the first private network being attached with the legitimate label, and control the second private network to analyze perform an analyzing operation on the communication request based on the sender legitimate signal.

The apparatus embodiment corresponding to the foregoing method embodiment. In the apparatus for communication between private networks provided by embodiments of the present disclosure, the private networks establish communication links only with the centralized cloud enterprise network respectively, so as to achieve the purpose of data communication between the private networks with the least number of communication links established with the help of a formed star topology. In addition, the establishment of the communication links is based on the establishment of the master instance in the centralized cloud enterprise network and the sub-instances provided in the private networks, no complicated configuration is required, which is more convenient and efficient, and the network complexity is low.

According to an embodiment of the present disclosure, an electronic device and a computer readable storage medium are provided.

Figure 8:
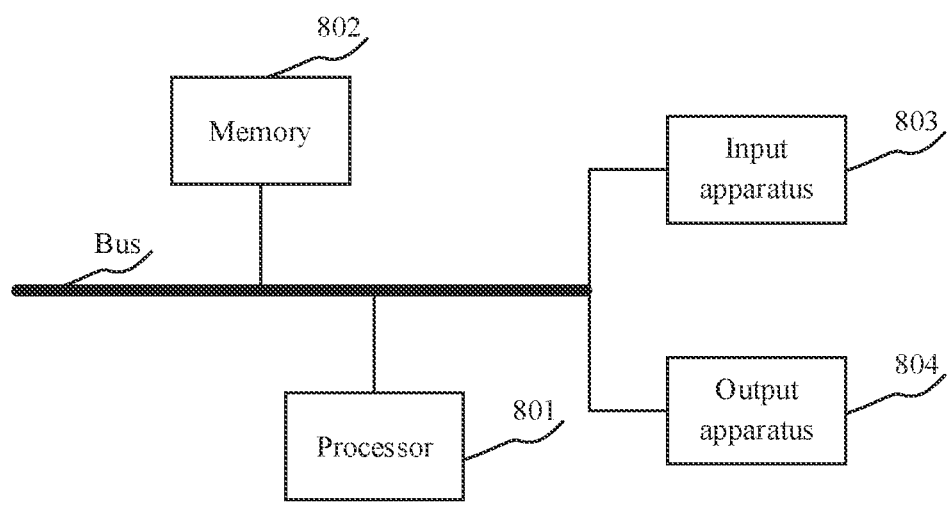
FIG. 8 is a schematic structural diagram of an electronic device suitable for implementing the method for communication between private networks according to an embodiment of the present disclosure.

FIG. 8 shows a block diagram of an electronic device suitable for implementing the method for communication between private networks according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 8, one processor 801 is used as an example.

The memory 802 is a non-transitory computer readable storage medium provided by an embodiment of the present disclosure. The memory stores instructions executable by at least one processor, so that the at least one processor performs the method for communication between private networks provided by embodiments of the present disclosure. The non-transitory computer readable storage medium of the present disclosure stores computer instructions for causing a computer to perform the method for communication between private networks provided by embodiments of the present disclosure.

The memory 802, as a non-transitory computer readable storage medium, may be used to store non-transitory software programs, non-transitory computer executable programs and modules, such as program instructions/modules corresponding to the method for communication between private networks in embodiments of the present disclosure (for example, the communication request receiving unit 701, the communication destination determination unit 702, the communication request sending unit 703 as shown in FIG. 7). The processor 801 executes the non-transitory software programs, instructions, and modules stored in the memory 802 to execute various functional applications and data processing of the server, that is, to implement the method for communication between private networks in the foregoing method embodiments.

The memory 802 may include a storage program area and a storage data area, where the storage program area may store an operating system and an application program required by at least one function; and the storage data area may store such as data created by the use of the electronic device performing the method for communication between private networks. In addition, the memory 802 may include a high-speed random access memory, and may also include a non-transitory memory, such as at least one magnetic disk storage device, a flash memory or other non-transitory solid state storage devices. In some embodiments, the memory 802 may optionally include a memory disposed remotely relative to processor 801, which may be connected through a network to the electronic device suitable for performing the method for communication between private networks. Examples of such networks include, but are not limited to, the Internet, enterprise intranets, local area networks, mobile communication networks and combinations thereof.

The electronic device suitable for performing the method for communication between private networks may also include: an input apparatus 803 and an output apparatus 804. The processor 801, the memory 802, the input apparatus 803 and the output apparatus 804 may be connected through a bus or in other ways, and an example of the connection through a bus is shown in FIG. 8.

The input apparatus 803 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other. A server may be a cloud server, also known as a cloud computing server or cloud host, is a host product in cloud computing service system, to solve the problems in traditional physical host and virtual private server (VPS) service, such as difficult management and poor business expansibility.

According to embodiments of the present disclosure, the private networks establish communication links only with the centralized cloud enterprise network respectively, so as to achieve the purpose of data communication between the private networks with the least number of communication links established with the help of a formed star topology. In addition, the establishment of the communication links is based on the establishment of the master instance in the centralized cloud enterprise network and the sub-instances set in the private networks, no complicated configuration is required, which is more convenient and efficient, and the network complexity is low.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for communication between private networks, comprising:
receiving a communication request sent by a first sub-instance provided in a first private network, the first sub-instance being created based on that the first private network initiates a network registration request to a master instance;
determining a second private network as a destination based on the communication request; and
sending the communication request to the second private network through a second sub-instance provided in the second private network, the second sub-instance being created based on that the second private network initiates a network registration request to the master instance, wherein the first private network, the second private network, and a cloud enterprise network provided with the master instance forms a star topology centered on the cloud enterprise network,
wherein a process of creating the first sub-instance comprises:
receiving the network registration request initiated by the first private network;
determining a first communication address of the first private network based on the network registration request, comprising: identifying the first communication address of the first private network included in the network registration request based on a border gateway protocol;
returning a sub-instance creation instruction through the first communication address; and
controlling the first private network to create the first sub-instance based on the received sub-instance creation instruction.

2. The method according to claim 1, wherein a process of creating the second sub-instance comprises:
receiving the network registration request initiated by the second private network;
determining a second communication address of the second private network based on the network registration request;
returning a sub-instance creation instruction through the second communication address; and
controlling the second private network to create the second sub-instance based on the received sub-instance creation instruction.

3. The method according to claim 1, further comprising:
generating a private network routing table based on the communication address of each private network identified by the border gateway protocol.

4. The method according to claim 3, further comprising:
when a new private network completing a network registration request, sending a latest updated network routing table including a communication address of the new private network to each private network currently registered with the master instance respectively.

5. The method according to claim 1, further comprising:
controlling the second private network to verify whether a sender of the communication request is a legitimate network based on a preset whitelist; and
in response to the sender of the communication request being an illegitimate network that is not recorded on the whitelist, controlling the second private network to discard the communication request, and returning a prompting message for indicating identity failure to the first private network through the first sub-instance.

6. The method according to claim 1, further comprising:
receiving a sender legality verification request sent through the second sub-instance, wherein the sender legality verification request is sent through the second sub-instance when the second private network receives the communication request;

verifying whether the first private network that sends the communication request is attached with a legitimate label based on the sender legality verification request; and in response to the first private network being attached with the legitimate label, returning a sender legitimate signal to the second private network through the second sub-instance, and controlling the second private network to perform an analyzing operation on the communication request based on the sender legitimate signal.

7. An electronic device, comprising:
at least one processor; and
a memory, communicatively connected to the at least one processor; wherein, the memory, storing instructions executable by the at least one processor, the instructions, when executed by the at least one processor, cause the at least one processor to perform operations, the operations comprising:
receiving a communication request sent by a first sub-instance provided in a first private network, the first sub-instance being created based on that the first private network initiates a network registration request to a master instance;
determining a second private network as a destination based on the communication request; and
sending the communication request to the second private network through a second sub-instance provided in the second private network, the second sub-instance being created based on that the second private network initiates a network registration request to the master instance, wherein the first private network, the second private network, and a cloud enterprise network provided with the master instance forms a star topology centered on the cloud enterprise network,
wherein a process of creating the first sub-instance comprises:
receiving the network registration request initiated by the first private network;
determining a first communication address of the first private network based on the network registration request, comprising: identifying the first communication address of the first private network included in the network registration request based on a border gateway protocol;
returning a sub-instance creation instruction through the first communication address; and
controlling the first private network to create the first sub-instance based on the received sub-instance creation instruction.

8. The electronic device according to claim 7, wherein the operations further comprise:
generating a private network routing table based on the communication address of each private network identified by the border gateway protocol.

9. The electronic device according to claim 8, wherein the operations further comprise:
when a new private network completing a network registration request, sending a latest updated network routing table including a communication address of the new private network to each private network currently registered with the master instance respectively.

10. The electronic device according to claim 7, wherein the operations further comprise:
controlling the second private network to verify whether a sender of the communication request is a legitimate network based on a preset whitelist; and in response to the sender of the communication request being an illegitimate network that is not recorded on the whitelist, controlling the second private network to discard the communication request, and returning a prompting message for indicating identity failure to the first private network through the first sub-instance.

11. The electronic device according to claim 7, wherein the operations further comprise:
receiving a sender legality verification request sent through the second sub-instance, wherein the sender legality verification request is sent through the second sub-instance when the second private network receives the communication request;
verifying whether the first private network that sends the communication request is attached with a legitimate label based on the sender legality verification request; and
in response to the first private network being attached with the legitimate label, returning a sender legitimate signal to the second private network through the second sub-instance, and controlling the second private network to perform an analyzing operation on the communication request based on the sender legitimate signal.

12. A non-transitory computer readable storage medium, storing computer instructions, the computer instructions, when executed by a processor, cause the processor to perform operations, the operations comprising:
receiving a communication request sent by a first sub-instance provided in a first private network, the first sub-instance being created based on that the first private network initiates a network registration request to a master instance;
determining a second private network as a destination based on the communication request; and
sending the communication request to the second private network through a second sub-instance provided in the second private network, the second sub-instance being created based on that the second private network initiates a network registration request to the master instance, wherein the first private network, the second private network, and a cloud enterprise network provided with the master instance forms a star topology centered on the cloud enterprise network,
wherein a process of creating the first sub-instance comprises:
receiving the network registration request initiated by the first private network;
determining a first communication address of the first private network based on the network registration request, comprising: identifying the first communication address of the first private network included in the network registration request based on a border gateway protocol;
returning a sub-instance creation instruction through the first communication address; and
controlling the first private network to create the first sub-instance based on the received sub-instance creation instruction.

13. The non-transitory computer readable storage medium according to claim 6, wherein the operations further comprise:
generating a private network routing table based on the communication address of each private network identified by the border gateway protocol.

14. The non-transitory computer readable storage medium according to claim 13, wherein the operations further comprise:
when a new private network completing a network registration request, sending a latest updated network routing table including a communication address of the new private network to each private network currently registered with the master instance respectively.

* * * * *